March 17, 1953 M. M. HOLBEN ET AL 2,631,901
VIBRATION DAMPER
Filed Dec. 1, 1949 2 SHEETS—SHEET 1

INVENTORS
MARTIN M. HOLBEN.
CHARLES S. JEWETT.
BY
ATTORNEY

March 17, 1953  M. M. HOLBEN ET AL  2,631,901
VIBRATION DAMPER

Filed Dec. 1, 1949  2 SHEETS—SHEET 2

INVENTORS
MARTIN M. HOLBEN.
CHARLES S. JEWETT.
BY
Victor D. Behn
ATTORNEY

Patented Mar. 17, 1953

2,631,901

UNITED STATES PATENT OFFICE 2,631,901

VIBRATION DAMPER

Martin M. Holben, Ridgewood, and Charles S. Jewett, Hasbrouck Heights, N. J., assignors to Curtiss-Wright Corporation, a corporation of Delaware Application December 1, 1949, Serial No. 130,448

4 Claims. (Cl. 308—26)

This invention relates to vibration damping means and is particularly directed to means for damping lateral vibrations of a rotating member.

Any unbalance in a high speed rotating shaft such as the shaft of a gas turbine, causes severe lateral vibration of said shaft. An object of the present invention comprises the provision of a novel viscous damper for damping said lateral vibrations.

In accordance with the present invention the shaft whose lateral vibrations are to be damped is supported in a bearing and the non-rotating outer race of said bearing is received within an annular channel in the bearing-supporting member. In addition, flexible sleeve-like means is disposed between said non-rotating bearing race and the bottom of said channel. At least one of the facing surfaces of said sleeve-like means and the bottom of said channel has a plurality of circumferentially spaced ribs and at least one of the facing surfaces of said sleeve-like means and said non-rotating bearing race has a plurality of circumferentially spaced ribs, said two sets of ribs being circumferentially staggered relative to each other. Each of said sets of ribs forms a plurality of circumferentially spaced spaces around its associated surface of said sleeve-like means to which a suitable liquid, as lubricating oil, is supplied. Lubricating oil is supplied to said spaces through a plurality of circumferentially spaced passageways opening through the bottom surface of said channel. Each of said passageways is adapted to be closed by said sleeve-like means when said sleeve-like means is pressed against the bottom surface of said channel about said passageway. With this construction lateral vibrations of said shaft cause deflections of said sleeve-like means to vary the relative volumes of said inter-rib spaces, thereby causing oil to flow between said spaces to damp said shaft vibrations. In addition, oil is squeezed between said non-rotating bearing race and the side walls of said channel to further damp said vibrations.

Other objects of the invention will become apparent upon reading the annexed detailed description in connection with the drawing, in which:

Figure 3 is a view taken along line 3—3 of Figure 2; and

Figure 4 is an enlarged view of a portion of Figure 1.

Figure 1:
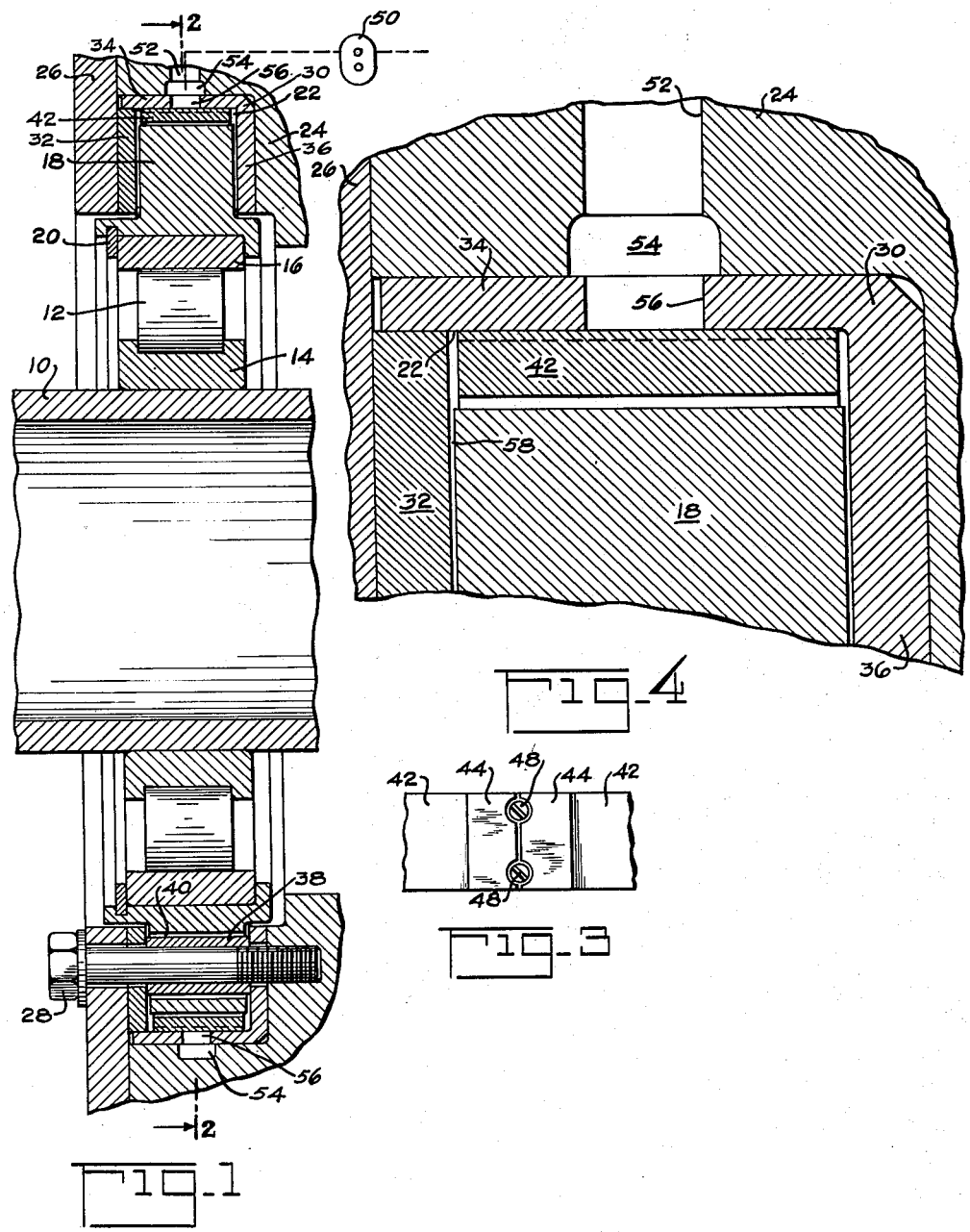
Figure 1 is an axial sectional view through a shaft and a shaft support embodying the invention and taken along line 1—1 of Figure 2.
Figure 2:
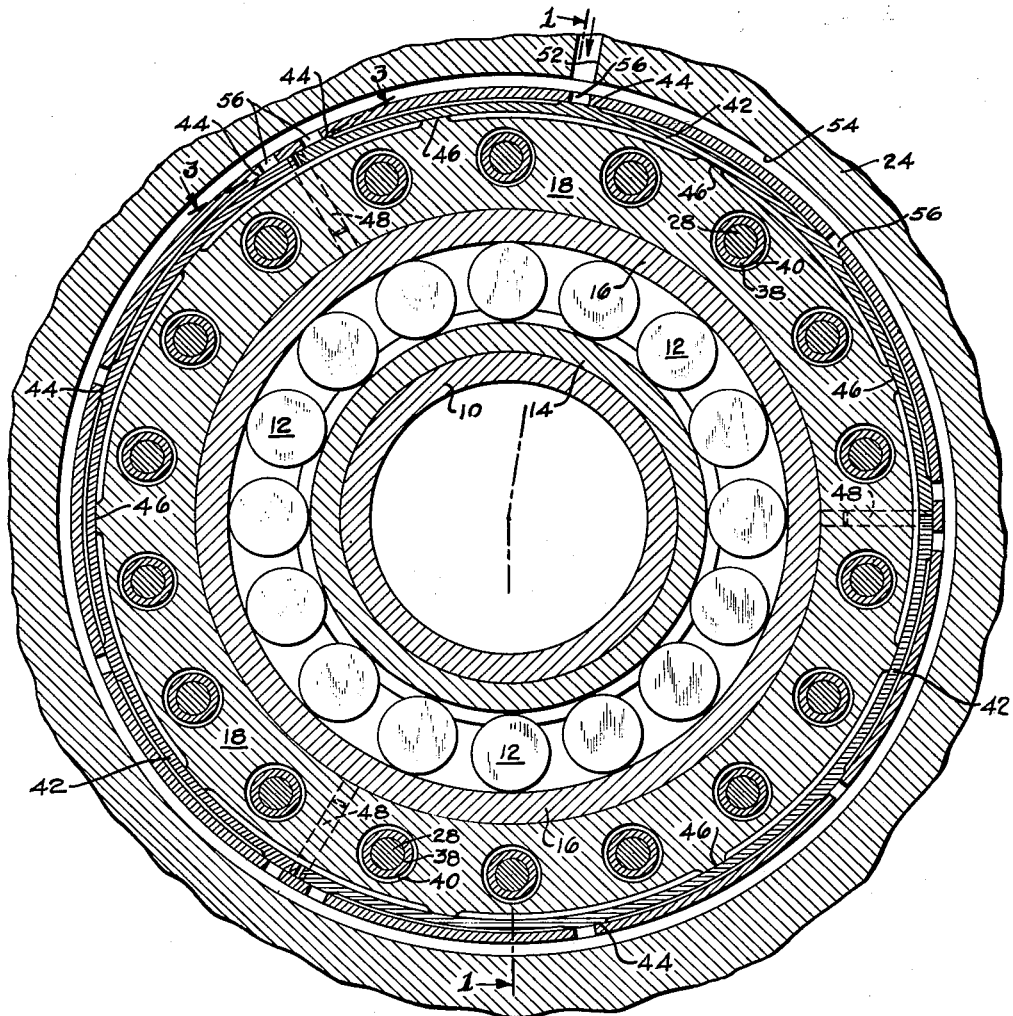
Figure 2 is a sectional view taken along line 2—2 of Figure 1.

Referring to the drawing, a shaft 10 is journaled in a roller bearing 12 having an inner race 14 secured to and above the shaft 10 and having an outer race 16. The outer race 16 is secured to an annular member 18 which is held in position about the outer bearing race by a split ring 20. As will appear, however, the annular member 18 may be formed rigid with the outer bearing race 16.

The annular bearing member 18 is received within an annular inwardly opening channel 22 formed in and carried by the supporting structure 24, said member 18 having limited radial freedom relative to the support 24. This channel 22 is formed by a plate 26 which is secured to the support 24 by screws 28. The internal dimensions of the channel 22 are accurately determined by rings 30 and 32 secured therein. The ring 30 has a right angle cross-section with one leg 34 having a shrink fit with the support 24. The other leg 36 of the ring 30 and the ring 32 form the side walls of the channel 22, said side walls being held apart by spacing bushings 38 disposed about the screws 28. The spacing bushings 38 extend through the annular bearing member 18 in clearance relation thereto, as indicated at 40, to permit radial or lateral movement of said bearing relative to its supporting structure 24.

A sleeve 42 is disposed between the annular bearing member 18 and the bottom of the channel 22, said sleeve preferably being split, as illustrated, into a plurality of segments disposed in end-to-end relation to form a complete ring. On the outer surface of the sleeve 42 is formed a plurality of circumferentially spaced ribs 44 extending axially from one end face of said ring to its other end face with a rib 44 disposed at each end of said ring segment. The outer surface of the annular bearing member 18 is also provided with a plurality of circumferentially spaced ribs 46 extending axially from one end of said member to its other end. The ribs 46 are circumferentially staggered relative to the ribs 44. This staggered relationship is maintained by means of a plurality of pairs of pins 48 secured to the bearing member 18 which is held against rotation by the screws 28. Each pair of adjacent ends of the segments of the sleeve 42 have the heads of a pair of said pins disposed therebetween, as best seen in Figure 3, thereby preventing rotation of said sleeve. The sleeve 42 is flexible and in the normal or non-deflected position of the shaft 10, all the ribs 44 contact the bottom surface of the channel 22 and all the ribs 46 contact the flexible sleeve 42 whereby said sleeve and bearing 12 provide a resilient support for the shaft 10 permitting limited lateral or radial movement of said shaft. Thus any unbalance force on the shaft 10 is transmitted to the flexible sleeve 42 through one or more of the ribs 46 on the side of the shaft toward which said force is directed. Then because the adjacent ribs 44 are in contact with the bottom of the channel 22, the flexible sleeve 42 will bend between said ribs 44 and 46. The multi-segment construction of the sleeve 42 increases its flexibility to lateral deflections of the shaft 10 as compared to a one-piece construction.

A suitable liquid, as for example lubricating oil, is supplied to the channel 22 from a pump 50 through a supply passageway 52 to an annulus formed about the leg 34 of the ring 30 and then through a plurality of circumferentially spaced passageways 56 communicating with said annulus. The passageways 56 comprise holes through the leg 34 of the ring 30 whereby lubricating oil is supplied through and at a plurality of circumferentially spaced points along the bottom surface of the channel 22. As a result the spaces between the ribs 44 and the spaces between the ribs 46 become filled with oil. Each of the inter-rib spaces is in restricted communication with the other inter-rib spaces around the axial end faces of the sleeve 42. In addition, the clearance 58 between the annular bearing member 18 and the side walls of the channel 22 is small, thereby providing a restricted leakage flow path for lubricating oil from the bottom of the channel 22. For example, the clearance 58 may approximate 0.001 inch which as illustrated is considerably less than the clearance between the flexible sleeve 42 and the side walls of the channel 22.

Each of the passageways 56 opens into the channel 22 over one of the ribs 44 and said ribs have an outer cylindrical surface similar to the cylinder bottom surface of the channel 22 about said passageways so that each of said passageways is closed when its associated rib is pressed against the surrounding bottom surface of the channel 22.

With the aforedescribed construction, when the shaft 10 deflects laterally from its normal position the sleeve 42 will bend or deflect between one or more ribs 44 and/or between one or more ribs 46, thereby changing the relative volumes of the inter-rib spaces. Thus the volume of one or more inter-rib spaces on the side of the shaft 10 toward which said shaft has deflected is reduced as a result of said deflection, whereby oil is squeezed or displaced out of said inter-rib space. Most of this displaced oil is forced into other inter-rib spaces whose volume is increased as a result of said shaft deflection. Some of said displaced oil is forced out through the restricted passageway or clearance 58 between the annular member 18 and the side walls of the channel 22. When the shaft 10 deflects laterally the ribs 44, on the side of said shaft toward which said shaft deflects, press against the bottom surface of the channel around the adjacent inlet passageways 56 thereby closing said passageways to at least substantially prevent the oil squeezed out of the spaces between the ribs 44 from being pumped or forced back into the supply passageway 52.

As the unbalance force on the shaft 10 and its resulting shaft deflection advance around the axis of said shaft, the volumes of one or more inter-rib spaces, on the side of the shaft toward which said shaft is momentarily deflected, are reduced relative to other inter-rib spaces. Accordingly, as the shaft 10 rotates oil is transferred around the shaft between said inter-rib spaces via the clearance between the end faces of the sleeve 42 and the side walls of the channel 22. This oil transfer together with that forced through the clearance 58 absorbs energy, thereby damping vibrations of the shaft 10.

In addition to the oil forced through the clearance 58 because of vibrations of the shaft 10, there is a continuous leakage flow through this clearance. The oil lost through clearance 58 is continually replaced through the oil supply passageway 52 and the open passageways 56. At any one moment the open passageways 56 are on the side of the shaft 10 remote from the side toward which said shaft has deflected. This continual oil flow from the inter-rib spaces through the clearance 58 helps to carry away the heat produced by the viscous damping of the shaft vibrations as a result of the aforedescribed oil flow.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. Means for damping lateral vibrations of a rotating shaft; said means comprising a support for said shaft; a bearing carried by said support and within which said shaft is journaled, said bearing having an annular bearing portion received within an annular inwardly opening channel in said support for limited radial movement relative to said support; sleeve-like means disposed about said annular bearing portion between said portion and the bottom of said channel; a first plurality of circumferentially-spaced axially-extending ribs disposed between the bottom surface of said channel and the outer surface of said sleeve-like means and being rigid with one of said surfaces for engagement with the other of said surfaces; a second plurality of circumferentially-spaced axially-extending ribs disposed between the inner surface of said sleeve-like means and the outer peripheral surface of said bearing portion and being rigid with one of said surfaces for engagement with the other of said surfaces, said first plurality of ribs being circumferentially staggered relative to said second plurality ribs and the space between each adjacent pair of ribs being in communication with other inter-rib spaces through the space between said sleeve-like means and a side wall of said channel; a plurality of circumferentially-spaced passageways for supplying liquid into said channel to the inter-rib spaces, said sleeve-like means being flexible whereupon lateral vibrations of said shaft cause said sleeve-like means to flex to vary the relative volumes of said inter-rib spaces and cause flow of said liquid relative to said inter-rib spaces thereby damping said vibrations, each of said passageways opening into said channel through its bottom surface at a point spaced from the side walls of said channel and at one of the ribs of said first plurality such that the channel end of said passageway is adapted to be closed by flexing of said sleeve-like means upon deflection of said shaft toward said rib.

2. Means for damping lateral vibrations of a rotating shaft; said means comprising a support for said shaft; a bearing carried by said support and within which said shaft is journaled, said bearing having an annular non-rotating portion received within an annular inwardly opening channel in said support for limited radial movement relative to said support; cylindrical sleeve-like means disposed about said non-rotating bearing portion between said portion and the bottom of said channel, said sleeve-like means comprising a plurality of segments disposed in end-to-end relation to form a complete annulus; means for preventing rotation of said sleeve-like means relative to said support; a first set of circumferentially spaced ribs formed on and extending axially along the outer surface of said sleeve-like means and engageable with the bottom surface of said channel; a second set of circumferentially-spaced axially extending ribs formed on one of the inner surfaces of said sleeve-like means and the outer peripheral surface of said non-rotating bearing portion so as to be engageable by the other of said surfaces, said first and second sets of ribs being circumferentially staggered relative to each other and the space between each adjacent pair of ribs being in communication with other inter-rib spaces through the space between said sleeve-like means and the side walls of said channel; a plurality of circumferentially spaced passageways in said support for supplying liquid into said channel to the inter-rib spaces, said sleeve-like means being flexible whereupon lateral vibrations of said shaft cause said sleeve-like means to flex to vary the relative volumes of said inter-rib spaces and cause flow of said liquid relative to said inter-rib spaces thereby damping said vibrations, each of said passageways opening into said channel through its bottom surface at a point spaced from the side walls of said channel and over one of the ribs of said first set such that the channel end of said passageway is adapted to be closed by said rib as a result of flexing of said sleeve-like means upon deflection of said shaft toward said rib.

3. Means for damping lateral vibrations of a rotating shaft; said means comprising a support for said shaft; a bearing carried by said support and within which said shaft is journaled, said bearing having an annular bearing portion received within an annular inwardly opening channel in said support; sleeve-like means disposed about said annular bearing portion between said portion and the bottom of said channel; a first set of circumferentially-spaced ribs extending axially along one side of said sleeve-like means and adapted to transmit forces from said shaft to said sleeve-like means; a second set of circumferentially-spaced ribs extending axially along the other side of said sleeve-like means and adapted to transmit said forces from said sleeve-like means to the bottom of said channel, said first set of ribs being circumferentially-staggered relative to said second set of ribs and each inter-rib space being in communication with other inter-rib spaces through the space between said sleeve-like means and an adjacent side wall of said channel; and a plurality of circumferentially-spaced passageways for supplying liquid into said channel to the inter-rib spaces, said sleeve-like means being flexible whereupon lateral vibrations of said shaft cause said sleeve-like means to flex to vary the relative volumes of said inter-rib spaces and cause flow of said liquid relative to said inter-rib spaces thereby damping said vibrations, each of said passageways opening into said channel through its bottom surface at a point spaced from the side walls of said channel and at one of the ribs of said second set such that the channel end of said passageway is adapted to be closed by flexing of said sleeve-like means upon deflection of said shaft toward said rib.

4. Means for damping lateral vibrations of a rotating shaft as recited in claim 3 and including means providing a drain passageway communicating with said inter-rib spaces and having a flow resistance relatively large compared to that of the flow paths between the inter-rib spaces.

MARTIN M. HOLBEN.
CHARLES S. JEWETT.

REFERENCES CITED

The following references are of record in the file of this patent:

UNITED STATES PATENTS

| Number | Name | Date |
|--------|------|------|
| 421,089 | Wood | Feb. 11, 1890 |
| 1,593,251 | Flintermann | July 20, 1926 |
| 2,403,489 | Birmann | July 9, 1946 |
| 2,515,861 | Campbell | July 18, 1950 |